United States Patent
Barr et al.

(10) Patent No.: US 8,774,030 B2
(45) Date of Patent: Jul. 8, 2014

(54) METHOD AND APPARATUS FOR PREAMBLE REDUCTION

(75) Inventors: David Barr, San Jose, CA (US); Michail Tsatsanis, Huntington Beach, CA (US)

(73) Assignee: Entropic Communications, Inc., San Diego, CA (US)

( * ) Notice: Subject to any disclaimer, the term of this patent is extended or adjusted under 35 U.S.C. 154(b) by 144 days.

(21) Appl. No.: 13/156,585

(22) Filed: Jun. 9, 2011

(65) Prior Publication Data

US 2011/0305157 A1 Dec. 15, 2011

Related U.S. Application Data

(60) Provisional application No. 61/352,893, filed on Jun. 9, 2010.

(51) Int. Cl.
*H04J 4/00* (2006.01)
*H04L 12/26* (2006.01)

(52) U.S. Cl.
USPC .......................................... 370/252; 370/436

(58) Field of Classification Search
USPC .......................... 370/254–340; 709/201–213
See application file for complete search history.

(56) References Cited

U.S. PATENT DOCUMENTS

| | | | |
|---|---|---|---|
| 2004/0048595 A1* | 3/2004 | Miller et al. | 455/334 |
| 2008/0186949 A1 | 8/2008 | Hafeez et al. | |
| 2009/0185534 A1* | 7/2009 | Barber et al. | 370/330 |
| 2009/0213833 A1 | 8/2009 | Cai et al. | |
| 2010/0124294 A1 | 5/2010 | Birru et al. | |
| 2011/0013717 A1* | 1/2011 | Josiam et al. | 375/295 |

* cited by examiner

*Primary Examiner* — Ayaz Sheikh
*Assistant Examiner* — Debebe Asefa
(74) *Attorney, Agent, or Firm* — Bruce Greenhaus

(57) ABSTRACT

A method of reducing resource overhead attributed to preambles in a communication system includes transmitting, at a transmitter, one or more signals including a first packet. The first packet is transmitted in a first time-frequency grant including a first set of one or more subcarriers. The first packet includes a full preamble including reference signal information for determining a total channel estimate for every subcarrier to be used in transmission of the first packet. A second packet is transmitted in a second time-frequency grant including a second set of one or more subcarriers without a full preamble when a receiver configured to communicate with the transmitter can determine a phase offset between the transmitter and the receiver from the signals received at the receiver.

18 Claims, 5 Drawing Sheets

METHOD AND APPARATUS FOR PREAMBLE REDUCTION

CROSS-REFERENCE TO RELATED APPLICATIONS

This application claims priority under 35 U.S.C. §119(e) from Provisional Application Ser. No. 61/352,893 filed Jun. 9, 2010, the entirety of which is hereby incorporated by reference herein.

FIELD

The disclosed method and apparatus relates to electronic communications networks, and more particularly, some embodiments relate to a system and method for increasing efficiency of communications by reducing the size of the preamble of a communication packet.

BACKGROUND

When communicating over a communication network, it is often helpful to be able to characterize the communication medium over which the communication is being transmitted. As used herein, "channel" refers to the particular medium (for example, wireless, coaxial cable, copper twisted pair or fiber optic cable) used to communicate between a transmitter and at least one receiver, the frequency used, as well as the modulation or other means for encoding information communicated over the channel. The process of characterizing the channel is commonly referred to as "channel estimation." Channel estimation may be performed in several ways.

One approach for channel estimation is through the use of a preamble which is sent immediately ahead of a portion of the information to be sent. That is, content of a message is typically divided into relatively small portions and sent in separate packets. Each packet includes several components, including the payload which contains the information that the transmitter is attempting to send to the receivers. Some of the other components in a packet include a preamble and a forward error correction (FEC) field. As is well known, bursty transmissions of packets allow transmission of small amounts of data over different channels to be interleaved. That is, a first packet of information can be transmitted to a first receiving node in a network from a transmitting node over a first channel. Immediately after the transmission of this first packet a second packet can be transmitted from either the first node or a second node to either the same recipients or to a different one or more receiving nodes. This differs from continuous transmissions in which a channel remains in use for an extended period of time.

Orthogonal frequency division multiplexing (OFDM) or orthogonal frequency division multiple access (OFDMA) transmissions typically involve the use of a preamble. In OFDM a signal is transmitted using multiple subcarriers at distinct frequencies. The subcarriers are received and assembled at the receiver to enable high-speed communication. OFDMA is a type of OFDM transmission in which dynamic assignment of a subset of the subcarriers to individual users allows multiple users to transmit at the same time. The signals of several different users will each be assigned to be transmitted on one or more unique subcarriers. Each subcarrier is generated and transmitted in a manner that allows subcarriers from different users to be transmitted concurrently without interfering with one another, enabling multiple access. Therefore, independent information streams can be modulated onto each subcarrier whereby each such subcarrier can carry independent information from a transmitter to one or more receivers.

Typically, unlike transmissions in a continuous transmission system, transmissions in a bursty packet based OFDM and OFDMA transmission system require a full preamble for each packet transmitted on each subcarrier in a time-frequency grant. For the purpose of the present discussion, a "full preamble" contains enough reference signal information for the receiver to determine a total channel estimate for every subcarrier to be used in the transmission. In some cases, the preamble is used to characterize the channel (i.e., perform channel estimation) by carrying a known set of information that can be interpreted at the receiver to determine any distortions that have occurred as a consequence of the characteristics of the channel. In other words, use of a preamble enables the receiver to compare an ideal channel against a channel that has distortion. In this way, the receiver can estimate the total distortion on that channel. That estimate includes measuring the combined effect of the channel plus the effect of any offset of the transmitter's carrier phase (i.e., any offset in the phase of the carrier used by the transmitter relative to the phase of the receiver's carrier). Such transmitter phase offset might be due to drift in an oscillator that generates the carrier frequency within the transmitter with respect to the oscillator within an intended receiver. The drift that can cause such an offset is typically constrained by a communications protocol specification that dictates the performance and operation of the network. One typical constraint on the drift may be 150 Hz/msec or 300 Hz/sec. Such drift can occur even if the upstream transmitter is phase-locked to the downstream broadcast from a receiver. In addition, the receiver uses the channel estimate to calculate inverse equalization factors.

Any time a channel is occupied by a preamble, the preamble reduces the channel capacity (amount of payload information that can be transmitted via the channel). Subcarriers used for transmitting preamble data at particular times are not available to transmit payload data at those times. As a result, the preamble constitutes overhead (in time-frequency) that taxes system resources. Therefore, it is generally advantageous to reduce the amount of overhead attributed to the preamble.

SUMMARY

The disclosed method reduces resource overhead attributed to preambles in a bursty packet based communication system. In accordance with the disclosed method and apparatus, a first packet is transmitted in a first time-frequency grant. The first time-frequency grant includes a first set of one or more orthogonal frequency division multiplexing (OFDM) or orthogonal frequency division multiple access (OFDMA) subcarriers to be used for a predetermined amount of time. The first packet includes a full preamble. A full preamble includes reference signal information for determining a total channel estimate for every subcarrier to be used in transmission of the first packet (i.e., every subcarrier in the time-frequency grant). A second packet is transmitted in a second time-frequency grant. The second time-frequency grant includes a second set of one or more subcarriers. The second packet does not have a full preamble when receivers configured to receive the packet can determine the nature of the channel between the transmitter and the receiver (or some subset of the subcarriers that make up the channel) from other signals received at the receiver, such as the signals used to transmit the first packet.

In some embodiments, a method of reducing resource overhead attributed to preambles in a communication system includes (1) receiving, at a receiver, one or more signals from a transmitter over a communications medium; (2) tracking effect of the communications medium on the signals based on the preambles in the received signals; and (3) estimating the effect of the communication medium on future signals to be transmitted on the channel. Tracking the effect of the communications medium on the signals allows the effect of the communication medium on future signals to be estimated without the need to have preambles transmitted with those future signals.

In one embodiment, the effect of a phase offset between local oscillator signals generated in the transmitter and local oscillator signals generated in the receiver is measured using a preamble transmitted on a limited number (i.e., one or more, but not all) of the orthogonal OFDMA subcarriers transmitted between the transmitter and receiver. The preamble includes reference signal information for determining a phase offset.

In some embodiments, a first network node on a network includes a computer processor, a physical layer interface and a computer readable storage medium. The physical layer interface includes a transmitter and a receiver. The physical layer interface is configured to provide communication between the first network node and at least a second network node on the network. Computer-executable instructions are stored on the computer readable storage medium. When executed, the instructions cause the processor to transmit one or more signals from the transmitter. The transmitted signals include a first packet in a first time-frequency grant. These signals are transmitted on a first set of one or more OFMDA subcarriers. The first packet includes a full preamble including reference signal information to allow a receiving node to determine a total channel estimate for every subcarrier on which the first packet is transmitted. The instructions also cause the processor to transmit a second packet without a full preamble. The second packet is transmitted in a second time-frequency grant that includes a second set of one or more subcarriers. The second packet is transmitted without the full preamble when the receiving network node in the network can determine from the previously transmitted full preamble, the channel estimate, including a phase offset, between the transmitter at the first node and a receiver at a second network node.

BRIEF DESCRIPTION OF THE DRAWINGS

The following will be apparent from elements of the figures, which are provided for illustrative purposes and are not necessarily to scale.

DETAILED DESCRIPTION

This description is intended to be read in connection with the accompanying drawings, which are to be considered part of the written description.

The disclosed method and apparatus reduces the total amount of overhead occupied by preambles sent in packets over a channel of a communication network.

Figure 1:
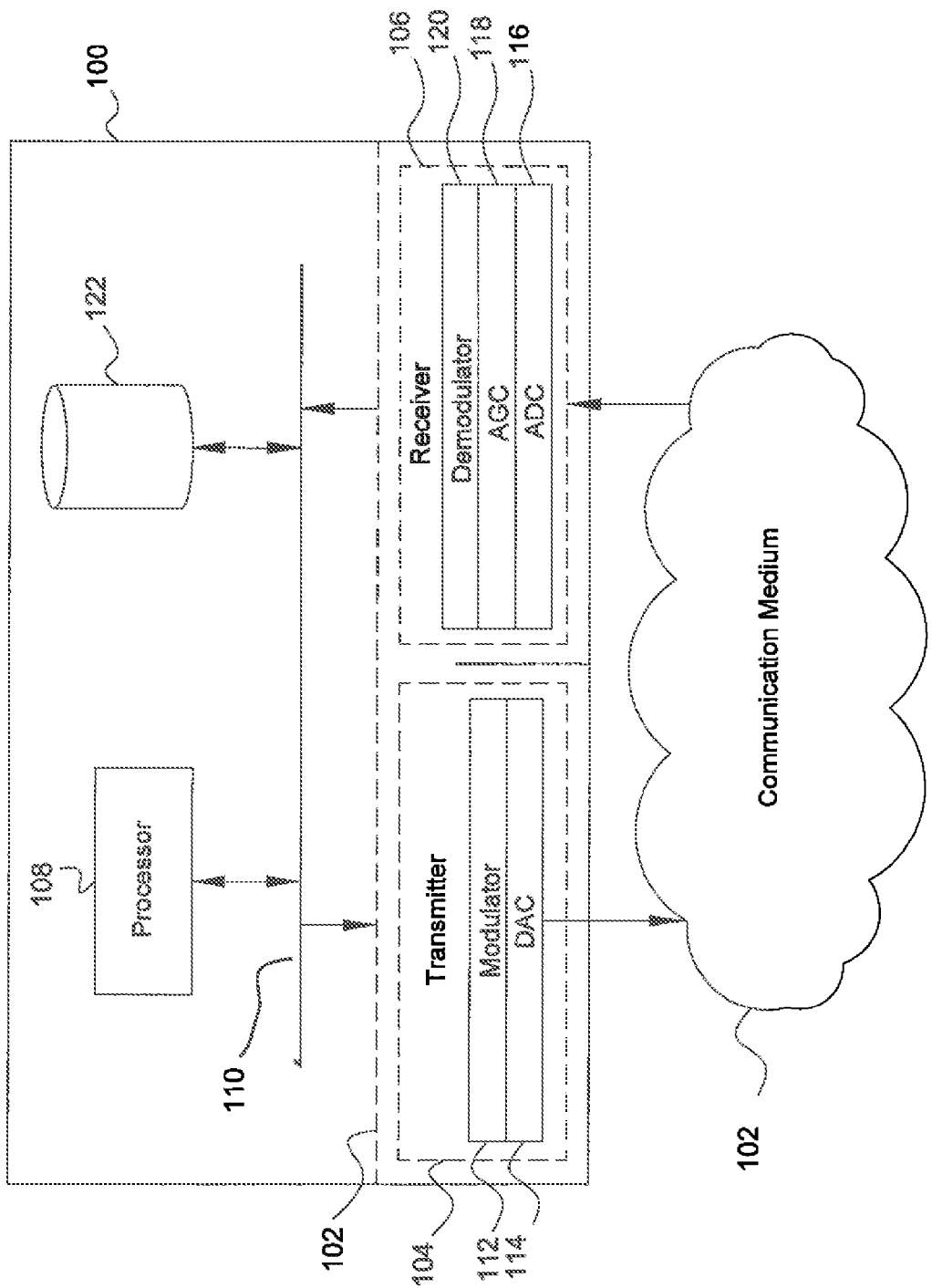
FIG. 1 is a block diagram of a network node in accordance with some embodiments.

Referring to FIG. 1, a network node 100 in a network comprising multiple network nodes may include a physical interface (PHY) 102 including a transmitter 104 and a receiver 106. The transmitter 104 and the receiver 106 are coupled to a processor 108 through a data bus 110. In one embodiment, the transmitter 104 includes a modulator 112 for modulating data according to a quadrature amplitude modulation (QAM) scheme (e.g., 8-QAM, 16-QAM, 32-QAM, 64-QAM, 128-QAM, or 256-QAM, or another modulation scheme). The transmitter 104 may also include a digital-to-analog converter (DAC) 114 for converting digital signals to analog signals to be transmitted to other network nodes through a communication medium 102.

In one such embodiment, the receiver 106 includes an analog-to-digital converter (ADC) 116 for converting an analog modulated signal received from another network node into a digital signal. In one embodiment, the receiver 106 also includes an automatic gain control (AGC) circuit 118 for adjusting the gain of the receiver 106 to properly receive the incoming signal and a demodulator 120 for demodulating the received signal. One of ordinary skill in the art will understand that other embodiments of the network node 100 include other combinations of the elements disclosed herein and additional circuitry and functional elements not described herein.

The processor 108 may be any central processing unit (CPU), microprocessor, micro-controller, or computational device or circuit for executing instructions. As shown in FIG. 1, the processor 108 is coupled to a computer readable storage medium 122 through the data bus 110. The computer readable storage medium may include a random access memory (RAM) and/or a more persistent memory, such as a read only memory (ROM). Examples of RAM include, but are not limited to, static random-access memory (SRAM), or dynamic random-access memory (DRAM). A ROM may be implemented as a programmable read-only memory (PROM), an erasable programmable read-only memory (EPROM), an electrically erasable programmable read-only memory (EEPROM), or the like, as will be understood by one skilled in the art. Alternatively, the memory 122 can be a disk drive or other such non-volatile storage medium.

Figure 2:
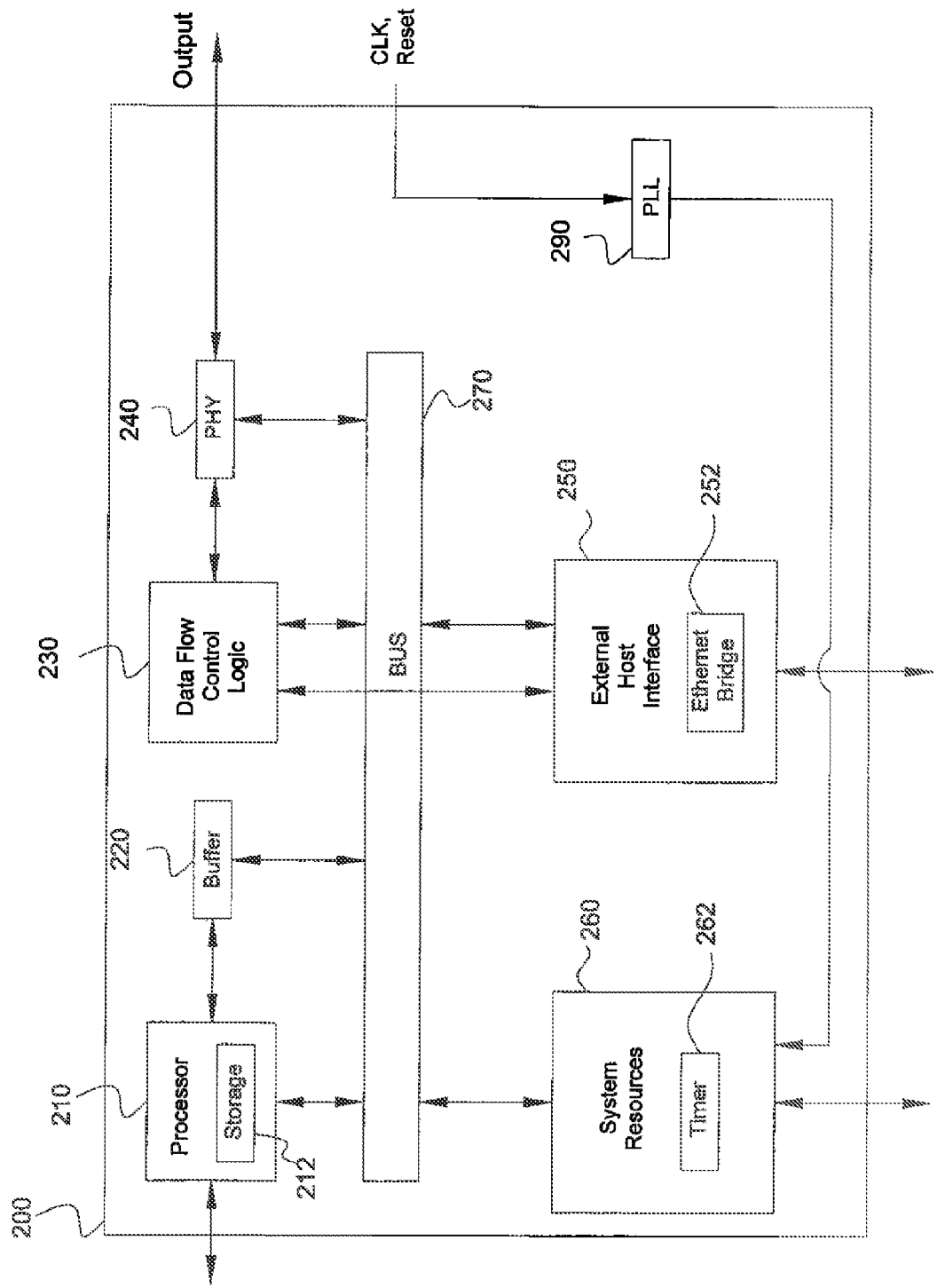
FIG. 2 is a block diagram of a hardware chip-level implementation of a network node in accordance with some embodiments.

FIG. 2 is a block diagram of a chip 200 used within a node of a network (e.g., network node 100 of FIG. 1) in accordance with some embodiments. FIG. 2 shows various components that may be included on a chip to implement functionality corresponding to a network node. Several such network nodes may form a Multimedia over Coax Alliance (MoCA) network, as described in the well known MoCA industry standard. In one embodiment of a MoCA network, a network coordinator (NC) coordinates synchronous OFDMA transmissions. Nodes transmit on sets of subcarriers. Each set of subcarriers defines a logical channel.

Any node in a MoCA network can function as the NC (i.e., perform the functions attributed to the NC). In the embodiment shown in FIG. 2, a processor 210 (which may be the processor 108 of FIG. 1), a buffer 220, a data flow control logic 230, a physical interface (PHY) 240, an external host interface 250, and a system resource module 260 communicate via a system bus 270. In one embodiment, the processor 220 includes a storage unit 212 (e.g., the computer readable storage medium 122 of FIG. 1). In some embodiments, the storage unit 212 is separate from the processor 220. In one embodiment, buffer 220 is a shared memory coupled to or on the same substrate as the processor 210. The buffer 220 buffers scheduling instructions (e.g., Media Access Plan (MAP) packets) received from an NC node. MAP packets transmitted by the NC schedule transmissions to and from each node in the network. The data flow control logic 230 coupled to the PHY 240 performs low level control functionality.

The PHY 240 provides signals to be output from the chip 200. The PHY 240 may be the PHY 102 of FIG. 1. In one embodiment, a host interface 250 includes an Ethernet bridge 252, e.g., for bridging communications between Ethernet and MoCA networks. The system resources module 260 includes a timer 262 for triggering transmissions at scheduled times. Clock and reset signals are provided to a phase locked loop (PLL) 290. In the embodiment shown in FIG. 2, the PLL 290 provides a baseband clock to the system resource module 260.

The chip architecture shown in FIG. 2 may be used to implement various embodiments disclosed herein. Other architectures can be used to implement these embodiments as well. The nodes disclosed herein may be included in various types of devices, including set top boxes, televisions, DVD or Blu-ray players or recorders, gaming consoles, computers (e.g., personal computers, desktop computers, notebook computers, handheld computers, or smart phones), and other devices for which it would be advantageous to establish communication with other devices on the network. Each network node 100 may be implemented using a separate chip 200.

Within each chip 200 corresponding to a particular node 100, the processor 210 implements the transmission schedule (e.g., transmits information during specified time-frequency grants) for that node 100. In one embodiment, instructions stored tangibly in storage 212 cause the processor 210 to transmit signals through the PHY 240 in accordance with a process 400 shown below in FIG. 4 or to receive signals through the PHY 240 in accordance with a process 500 shown in FIG. 5. Based on the timer 262 and a MAP received from the NC node, the processor 210 of a node 100 causes a transmitter in the PHY 240 in FIG. 2 to transmit information.

In accordance with one embodiment, an estimate of the distortion that occurs on the signals transmitted on each subcarrier of an OFDM channel, (i.e., the "total channel estimate") is decomposed into two components.

The first component is the channel effect (e.g., coax channel). The channel effect includes any and all distortions that occur as a consequence of the signals passing through the medium. The channel effect of wired channels (e.g., fiber optic) varies slowly, for example at thermal timescales. In contrast, the channel effect of wireless channels can change more rapidly (e.g., every millisecond) if the transmitter is in motion or the environment between the transmitter and the receiver changes (i.e., objects passing through the medium, such as trucks that pass close to either the transmitter or receiver, etc.). If a user of a wireless device remains still, the channel may experience only slow changes that may be tracked in accordance with the disclosed method and apparatus to determine high coherence (i.e., a strong correlation between the conditions of the subcarriers of a particular channel and the subcarriers of different channels, as well as consistent conditions over short periods of time) and thereby make it possible to reduce the size of the preambles (and possibly eliminate some preambles).

The second component is the phase offset of the transmitter's radio frequency carrier relative to that of the receiver, which can drift from burst to burst (i.e., oscillator drift). The phase offset is attributable to the drift of the transmitter's radio frequency carrier. The phase offset will appear as a common offset on all of the transmitter's subcarriers received by the receiver. The amount of the offset will vary with frequency, but can be easily calculated, as will be understood by those skilled in the art.

In one embodiment, a receiver tracks the channel effect separately from the frequency drift. In one example, the receiver may employ tracking loops, which operate in a decision directed mode during the payload of the packet. In this way, slight changes in the channel response from packet to packet can be tracked by the receiver. The channel effect is tracked from previous preambles, payloads, probes, pilot tones, or other data sent from the given transmitter. However, the oscillator drift is estimated via a preamble transmitted on only some of the subcarriers. The common phase offset can be measured on one or more subcarriers, but less than all, so that there is no need for a full preamble. Consequently, the preambles can be reduced and thus occupy only a few of the subcarriers.

Accordingly, the preambles, when needed, may be smaller than in conventional approaches and thereby consume less overhead and induce less latency. In addition, no preamble is needed in a grant involving a new subcarrier not used in a preceding grant, if the receiver separately tracks the coax channel estimate to ascertain coherence and the channel effects are determined to be sufficiently coherent between subcarriers. The receiver may make a determination of sufficient channel coherence over time and then send a message to the transmitter indicating what type of preamble (or no preamble) is to be used for a subsequent packet. If the coherence of the channel is generally stable over time (e.g., in the case of a coax channel) and known beforehand, the determination as to whether a preamble is required and what the nature of the preamble should be can be predetermined and in some cases, can be specified in a protocol specification. In one embodiment, if the channel is not stable (e.g., wireless over-the-air), real-time feedback from the receiver to the transmitter enables the transmitter to vary the size of the preamble as appropriate. For example, in one embodiment, the receiver sends the transmitter an indication that channel coherence exceeds a predetermined coherence level. Thus, a reduced preamble may either be predetermined or selected by the receiver and pre-conveyed to the transmitter for subsequent transmissions.

In some embodiments, the size of a reduced preamble may be increased over time if performance suffers as a result of the reduced preamble. Likewise, if no preamble is used, either a reduced or full preamble can be used if the performance starts to suffer. If channel effects have changed since they were last determined, an error in some of the packets may occur. Upon detection of missed packets or errors in the packets, the size of the preamble can be increased in subsequent packets and ultimately, full preambles transmitted. Similarly, the size of the preambles may be reduced over time if performance is adequately high (e.g., errors are below a predetermined threshold). Thus, preamble size can be varied up or down to maintain a predetermined error rate or set point.

The transmitter and receiver may agree on the size of the preamble (whether a full, reduced, or no preamble) to be transmitted. This decision may be specified in a protocol specification, including any factors used to determine the size of the preamble. Alternatively, the receiver may decide the size of the preamble that the transmitter is to subsequently use and then convey the request to the transmitter during runtime. The details of such a request conveyance may be predetermined in a protocol specification.

Figure 3:
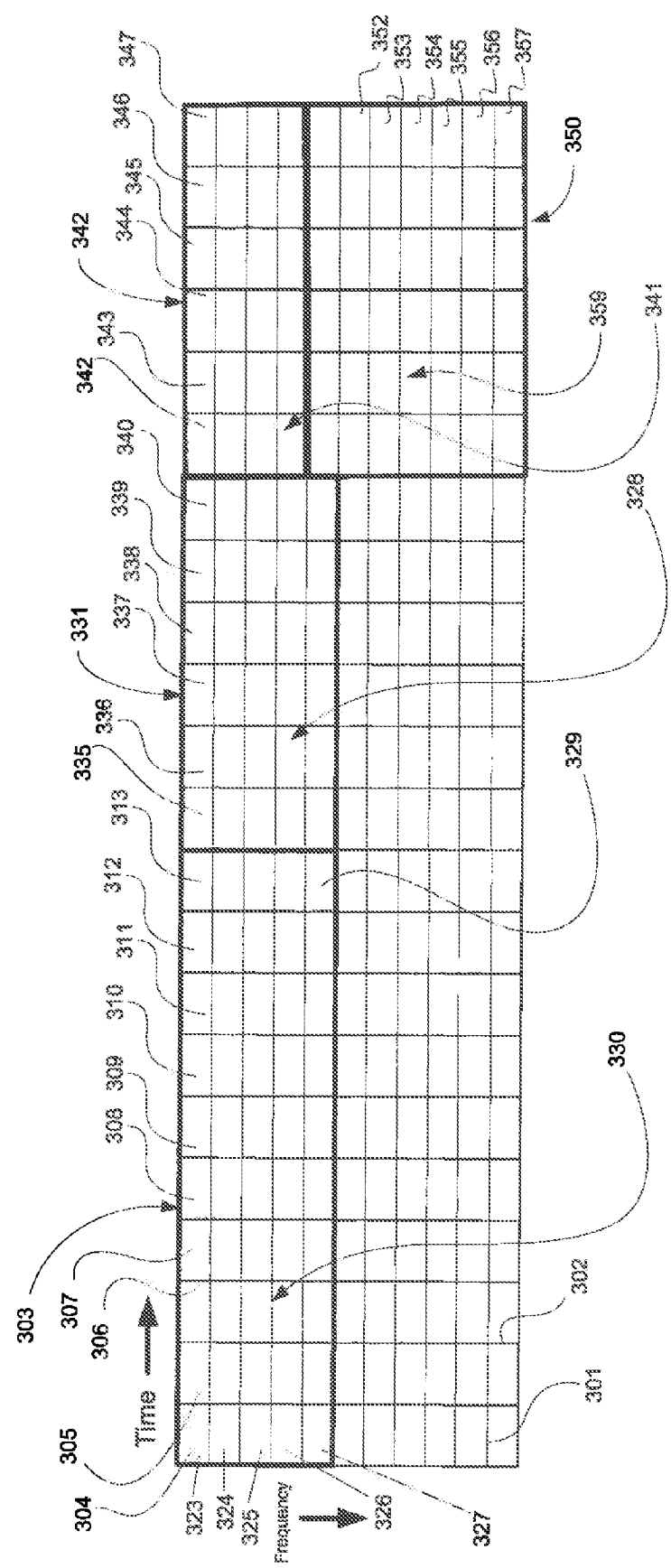
FIG. 3 is an illustration of several time-frequency grants.

FIG. 3 shows several time-frequency grants in a diagram of time versus frequency. The diagram is divided into eleven frequencies 323-327, 352-357 (or subcarriers) separated by horizontal lines 301 and twenty-two periods 304-313, 335-340, 342-347 separated by vertical lines 302. It will be understood by those skilled in the art that there would be many more than eleven subcarriers in a typical frequency band used in a MoCA network.

A first time-frequency grant 303 is shown in the upper left corner of the diagram of FIG. 3 (outlined in heavy lines). The time-frequency grant 303 is shown to have ten periods 304-313 during which OFDMA symbols can be transmitted. In addition, the grant 303 has five subcarriers 323-327 that are used to transmit OFDMA symbols. It should be noted that each subcarrier 323-327 can transmit ten constellation points, one such constellation point in each of the ten OFDMA symbol periods 304-313 of the time-frequency grant 303. Likewise, five subcarriers 323-327 are used to transmit five constellation points during each of the ten OFDMA symbol periods 304-313 in the time-frequency grant 303. Each group of five constellation points transmitted in one period constitutes one OFDMA symbol. Accordingly, the time-frequency grant 303 has a size of five subcarriers by ten periods (i.e., 50 symbols 329 can be transmitted during the time-frequency grant 303). Each of the 50 constellation points 329 (i.e., ten OFDMA symbols) can be either an overhead constellation point (such as a preamble constellation point) or a payload constellation point. Preamble symbols are shown in FIG. 3 as shaded.

In accordance with one example, a first transmitter TX1 (such as in the PHY 240 of FIG. 2 within a first node in the network) is granted the first time-frequency grant 303. The first transmitter TX1 transmits a full preamble 330 during the first three symbol periods 304, 305, 306 and on all five subcarriers 323-327 of the grant 303. The combination of these fifteen OFDMA symbols transmitted on all five subcarriers during three periods of the grant 303 constitutes a "full preamble" 330 that allows a total channel estimate to be made of the channel from transmitter TX1 to a receiver. An OFDMA burst of data (i.e., a payload) is transmitted in the subsequent seven periods 309-313 and on all five subcarriers 323-327 of the grant 303 (i.e., thirty-five OFDMA data symbols).

A second transmitter TX2 (such as in the PHY 240 of a second node in the network) is granted a second time-frequency grant 331. The second grant 331 is five subcarriers 323-327 by six periods 335-340. The second transmitter TX2 transmits a full preamble 328 (shown in shade in FIG. 3) on all five subcarriers 323-327 during the first three periods 335, 336, 337 of the second grant 331. The full preamble 328 transmitted by the second transmitter TX2 allows a total channel estimate to be made of the channel from second transmitter TX2 to each receiver that receives the transmission. It should be noted that several receivers may receive the full preamble 328. Thus, there may be several channels. There will be one channel estimate associated with each such channel between the transmitter TX2 and a unique receiver. This is true of the transmission from the first transmitter TX1 as well.

As shown in FIG. 3, the first transmitter TX1 is granted a third time-frequency grant 342. The third time-frequency grant 342 is four subcarriers 323-326 by six periods 342-347. The third grant 342 includes a reduced preamble 341 (shown in shade in FIG. 3). In such a reduced preamble, fewer than all subcarriers 323-326 used to transmit the payload are used to transmit the reduced preamble. In addition, a reduced preamble, such as the preamble 341 in FIG. 3 can be sent during less periods than are needed to send the full preamble 330. In the example shown in FIG. 3, only one subcarrier 326 is used to transmit the preamble. In addition, the reduced preamble 341 is only transmitted during one period 342. In some embodiments, no preamble is used at all for the grant 342 (i.e., reduced preamble is reduced to zero). Accordingly, it will be understood that a reduced preamble can be reduced by either reducing the number of subcarriers, the number of periods or both. It should be further noted that the "reduced preamble" may include the case in which the preamble is zero (i.e., no preamble is sent at all).

Upon receiving the reduced preamble, receiver(s) determine the characteristics of the channel(s) from TX1's previous transmission of the full preamble 330 transmitted during the first time-frequency grant 303. This is possible because the same transmitter TX1 is used for the first and third grants 303, 342. The number of symbols that will need to be transmitted in the reduced preamble 341 will depend upon how rapidly the channel changes and the amount of time between the first grant 303 and the third grant 342. Accordingly, if the channel is changing very slowly (as in the case of a network in which the medium is coaxial cable) and little time has elapsed between the end of the full preamble transmitted in the first grant 303 and the start of the third grant 342, then it may not be necessary to transmit a preamble at all during the third time-frequency grant 342. Alternatively, if there was either a longer time or the channel is changing more rapidly, then it may be necessary to transmit two symbols on each subcarrier (as opposed to three symbols in the case of a full preamble). In the example shown in FIG. 3, the reduced preamble 341 is transmitted only during the first period 342 of the fourth subcarrier 326 (shown as shaded in FIG. 3). In this case, the phase offset of each subcarrier can be determined based on the reduced preamble 341. The channel effect can be determined from the previously transmitted preambles 303 transmitted by the first transmitter TX1.

It should be noted that the particular size (i.e., number of OFDMA symbols and number of subcarriers per symbol) of a full preamble will depend upon the particular implementation. The particular size of a reduced preamble will also depend upon the particular implementation. However, the reduced preamble will always have less OFDMA symbols then the full preamble. In addition, a reduced preamble may be transmitted on fewer of the subcarriers then is the case for the full preamble. Thus, in various embodiments, additional resources (in terms of time and frequency) are available for transporting payload data due to a reduced (or nil) preamble. It should be noted that phase offset caused by oscillator drift is separate and independently varying. However, since the drift is common to all of the subcarriers, determining the phase offset that is present in of any one subcarrier will allow the determination of the amount of phase offset in each of the other subcarriers. However, the offset caused by the drift typically will vary more rapidly than changes in the channel effects over a coaxial cable. Therefore, it may be necessary to transmit a reduced preamble in which at least one preamble symbol is transmitted on at least one subcarrier.

A fourth time-frequency grant 350 is also shown in FIG. 3. The fourth grant 350 is to be transmitted by the second transmitter TX2. The grant 350 uses seven subcarriers, six of which 352-357 were not used in the previous three grants 303, 331, 342. The fourth grant 350 is six periods 342-347 long. The seventh subcarrier 327 was used by the first two grants 303, 331, but was not used in the third grant 342. Thus, the subcarrier 327 was available for inclusion in the fourth grant 350, which occurs at the same time as the third grant 342.

The transmission from the second transmitter TX2 during the fourth grant 350 includes a preamble 359, but only for those subcarriers 352-357 over which preamble symbols were not transmitted in the second grant 331 (i.e., those subcarriers that the receivers could not track the channel effects using the previous grant 331). In the example shown in FIG. 3, the preamble is sent on the six subcarriers 352-357 during the first two periods 342, 343 of the fourth grant 350 (as noted by the shading in FIG. 3). In one embodiment, the channel effects of the subcarrier 237 are sufficiently coherent over time that transmissions during the fourth grant 350 do not require a preamble in the subcarrier 237 used in the second grant 331. Rather, the receiver tracks the subcarriers 323-327 based on the preamble transmitted during the second grant 331. If the phase offset is the only unknown, then transmitting preamble symbols on only one subcarrier would be sufficient to detect the amount of phase offset in each of the subcarriers. In the case of the fourth time-frequency grant 350, the preamble symbols transmitted on subcarriers 352-357 can be used to determine the amount of phase offset in the signals received on the subcarrier 327.

Figure 4:
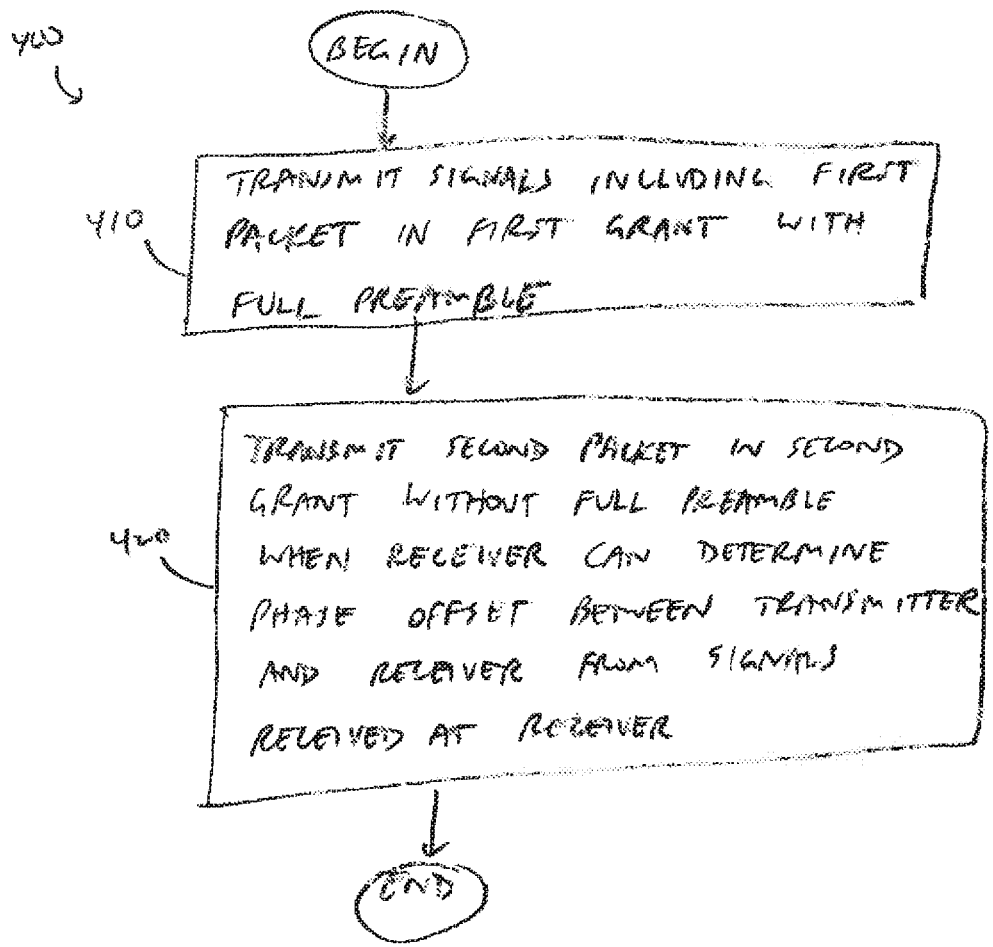
FIG. 4 is a flow diagram in accordance with some embodiments.

FIG. 4 is a flow diagram of a process 400. After the process 400 begins, one or more signals are transmitted (410) at a transmitter, including a first packet in a first time-frequency grant (e.g., grant 303). The first packet includes a full preamble (e.g., preamble 330) that includes reference signal information for determining a total channel estimate for every subcarrier to be used in transmission of the first packet. A second packet is transmitted (420) in a second grant (e.g., grant 342). If the receivers to which the communication are directed can determine a phase offset (i.e., between the oscillators in the transmitter and the oscillators in the receiver) from either signals previously received at the receiver or from some, but not all, of the subcarriers, then the second packet is transmitted with a reduced preamble 341.

Figure 5:
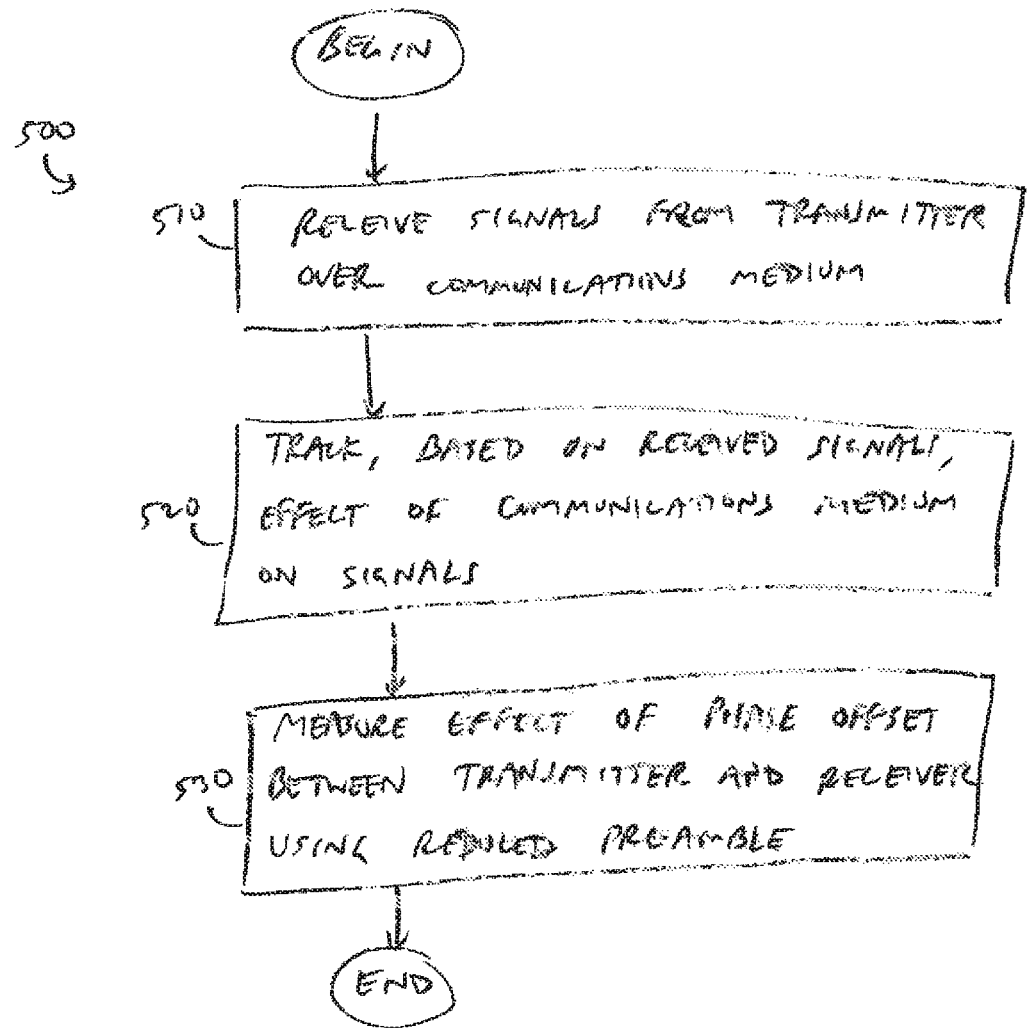
FIG. 5 is a flow diagram in accordance with some embodiments.

FIG. 5 is a flow diagram of a process 500. At a receiver, one or more signals are received (510) from a transmitter over a communications medium. Based on the received signals, the effect of the communications medium on the signals is tracked (520). The effect of a phase offset between the transmitter transmitting the received signals and the receiver receiving the received signals is measured (530), using a reduced preamble, e.g., preamble 341. The reduced preamble 341 includes reference signal information for determining a channel estimate using at least one OFDMA subcarrier 326 but not all subcarriers used to receive the signals.

While various embodiments of the disclosed method and apparatus have been described above, it should be understood that they have been presented by way of example only, and should not limit the claimed invention. The claimed invention is not restricted to the particular example architectures or configurations disclosed. Rather, the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

What is claimed is:

1. A method of reducing resource overhead attributed to preambles in a communication system, said method comprising:
   transmitting, at a transmitter, one or more signals including a first packet in a first time-frequency grant, the first packet including a first set of one or more subcarriers, the first packet further including a full preamble including reference signal information for determining a total channel estimate for every subcarrier to be used in transmission of the first packet to at least a first receiver; and
   transmitting a second packet in a second time-frequency grant including a second set of one or more subcarriers, the second packet further including a reduced preamble when the at least one receiver can determine: (1) channel effect between the transmitter and the receiver from the full preamble previously transmitted; (2) a phase offset for each subcarrier from the reduced preamble transmitted with the second packet.

2. The method of claim 1, further including:
   determining a packet error rate based on at least the transmission of the second packet; and
   if the packet error rate exceeds a predetermined threshold, transmitting a third packet in a third time-frequency grant, the third time-frequency grant including at least one subcarrier not used in the first and second time-frequency grants, wherein the third packet includes a reduced preamble, and wherein the reduced preamble is transmitted on at least one subcarrier of the third time-frequency grant not used in the first and second time-frequency grants.

3. The method of claim 1, further including:
   determining that channel coherence over time exceeds a predetermined coherence level;
   wherein the second packet is transmitted without any preamble data on those subcarriers used for the transmission of the first packet.

4. The method of claim 1, wherein the reduced preamble is transmitted using a single subcarrier.

5. The method of claim 1, wherein the reduced preamble is zero if the phase offset changes slow enough to allow use of the phase offset determined from the full preamble to also determine the phase offset of information transmitted in a payload of the second packet.

6. The method of claim 1, wherein transmitting the second packet includes transmitting the second packet with a preamble smaller than the full preamble, the method further including:

determining a packet error rate based on at least the transmission of the second packet;
determining an updated preamble size based on the determined packet error rate; and
transmitting a third packet in a third time-frequency grant with a preamble having the updated preamble size.

7. The method of claim 1, further including receiving an indication from a receiver instructing the transmitter to use a reduced preamble, the indication being received prior to transmitting the second packet;
and transmitting the second packet with the reduced preamble in response to the received indication.

8. A method of reducing resource overhead comprising:
receiving one or more signals on orthogonal frequency division multiplexing (OFDM) subcarriers transmitted over a communications medium;
tracking, based on the received signals, the effect of the communications medium on the signals; and
determining a phase offset using information received on less than all of the subcarriers on which the signals were received to reduce the size of preambles.

9. The method of claim 8, wherein the effect of the communications channel is determined based on preambles previously received on the subcarriers on which the one or more signals were received.

10. The method of claim 9, further including sending an indication instructing a transmitter to send packets with reduced preambles.

11. The method of claim 8, further including compensating received data at each subcarrier based on determining the phase offset.

12. An apparatus forming a network node on a network, said apparatus comprising:
a computer processor;
a physical layer interface including a transmitter and a receiver, the physical layer interface coupled to the processor; and
a non-transitory computer readable storage medium having computer-executable instructions stored thereon, the storage medium coupled to the processor, said instructions when executed causing said processor to:
transmit one or more signals, the signals including a first packet in a first time-frequency grant, the first time-frequency grant including a first set of one or more orthogonal frequency division multiplexing (OFDM) subcarriers, the first packet including a full preamble for determining a total channel estimate for every subcarrier used to transmit the first packet; and
transmit a second packet including a reduced preamble in a second time-frequency grant if an intended receiver of the second packet can determine a channel effect from the full preamble.

13. The apparatus of claim 12, wherein the instructions cause said processor to transmit the second packet with reduced preamble in response to a received message.

14. An apparatus forming a network node on a network, said apparatus comprising:
a computer processor;
a physical layer interface including a transmitter and a receiver, the physical layer interface coupled to the computer processor; and
a non-transitory computer readable storage medium having computer-executable instructions stored thereon, the storage medium coupled to the processor, said instructions causing said processor to:
determine channel effects imposed on signals of a first packet having a full preamble received over a communications medium based on the full preamble;
determine channel effects imposed on signals received in a second packet having a reduced preamble based on the full preamble;
determine a phase offset using reduced preamble.

15. The apparatus of claim 14, wherein the reduced preamble is transmitted on at least one OFDM subcarrier but not all OFDM subcarriers used to receive the second packet.

16. The apparatus of claim 15, wherein said instructions cause the processor to send an indication to another network node instructing the other network node to reduce the size of the full preamble.

17. An integrated circuit (IC) chip for use in a network node, the IC chip comprising:
a computer processor;
a physical layer interface including a transmitter and a receiver, the physical layer interface coupled to the computer processor; and
a non-transitory computer readable storage medium having computer-executable instructions stored thereon, the storage medium coupled to the processor, said instructions when executed causing said processor to:
transmit one or more signals, the signals including a first packet in a first time-frequency grant, the first time-frequency grant including a first set of one or more orthogonal frequency division multiplexing (OFDM) subcarriers, the first packet including a full preamble for determining a total channel estimate for every subcarrier used to transmit the first packet; and
transmit a second packet including a reduced preamble in a second time-frequency grant if an intended receiver of the second packet can determine a channel effect from the full preamble.

18. An integrated circuit (IC) chip for use in a network node, said IC chip comprising:
a computer processor;
a physical layer interface including a transmitter and a receiver, the physical layer interface coupled to the computer processor; and
a non-transitory computer readable storage medium having computer-executable instructions stored thereon, the storage medium coupled to the processor, said instructions causing said processor to:
determine channel effects imposed on signals of a first packet having a full preamble received over a communications medium based on the full preamble;
determine channel effects imposed on signals received in a second packet having a reduced preamble based on the full preamble;
determine a phase offset using reduced preamble.

* * * * *